(No Model.)

S. MYERS.
Apparatus for Tube Testing.

No. 235,798.  Patented Dec. 21, 1880.

Witnesses.
J. R. Carbison
Clarence Burleigh

Inventor.
Samuel Myers
by James I. Kay
Attorney

UNITED STATES PATENT OFFICE.

SAMUEL MYERS, OF PITTSBURG, PENNSYLVANIA, ASSIGNOR TO HIMSELF AND A. M. BYERS & CO., OF SAME PLACE.

APPARATUS FOR TUBE-TESTING.

SPECIFICATION forming part of Letters Patent No. 235,798, dated December 21, 1880.

Application filed August 30, 1880. (No model.)

*To all whom it may concern:*

Be it known that I, SAMUEL MYERS, of Pittsburg, in the county of Allegheny and State of Pennsylvania, have invented a new and useful Improvement in Apparatus for Testing Tubing; and I do hereby declare the following to be a full, clear, and exact description thereof, reference being had to the accompanying drawings, forming a part of this specification, in which—

Figure 1:
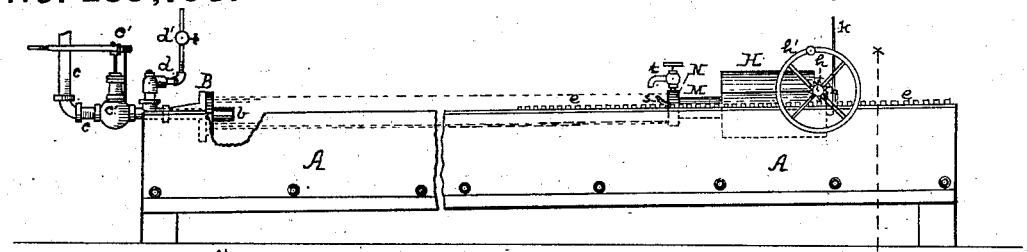
Figure 2:
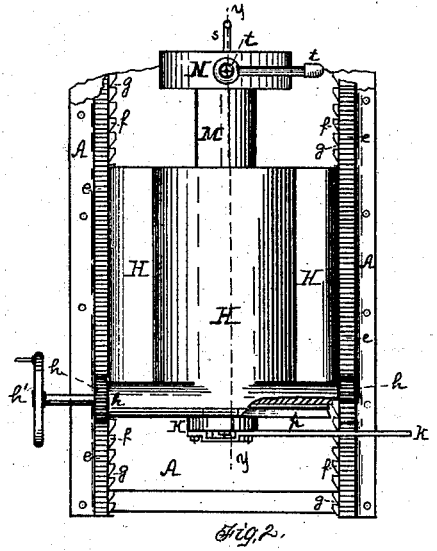
Figure 3:
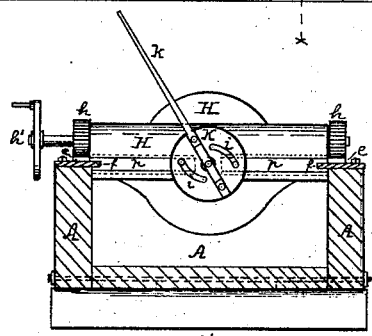
Figure 4:
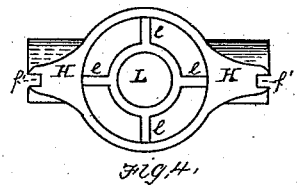
Figure 5:
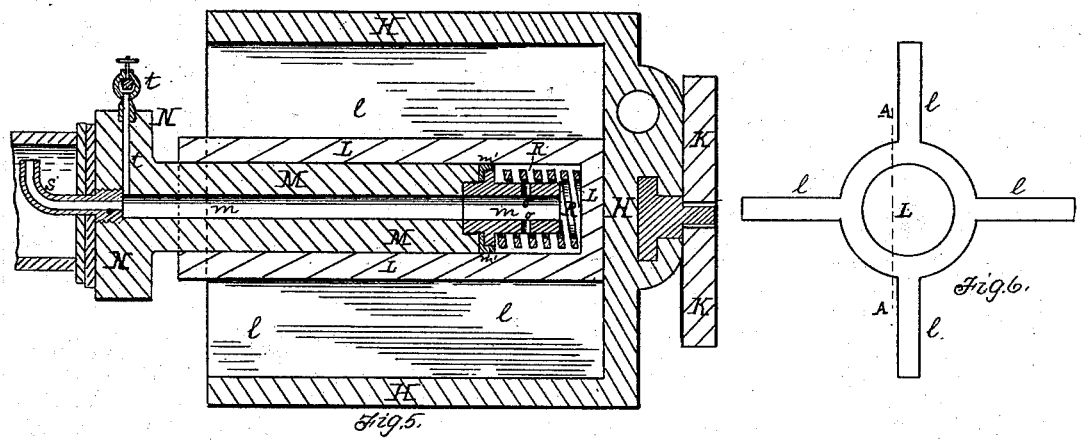
Figure 6:
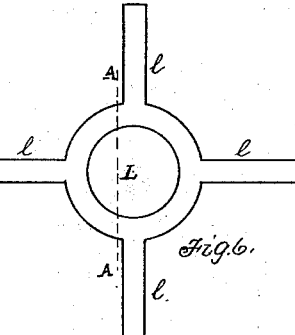
Figure 7:
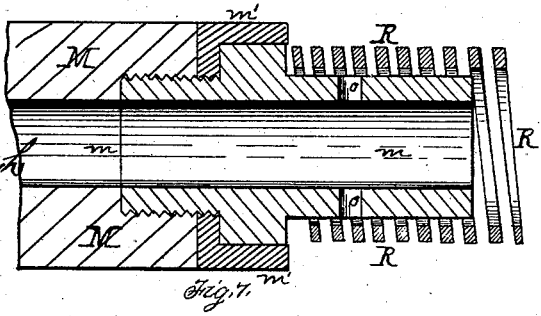

Figure 1 is a side view of my improved apparatus. Fig. 2 is a top view of the same, part of the trough being broken away. Fig. 3 is a cross-section on the line $xx$, Fig. 1. Fig. 4 is a front view of the cylinder chamber or buggy with the cylinder in place. Fig. 5 is a longitudinal vertical section on the line $yy$, Fig. 2. Fig. 6 is a front view of the removable cylinder, and Fig. 7 is an enlarged longitudinal section of the end of the piston.

Like letters of reference indicate like parts in each.

My invention relates to apparatus for testing metal tubing, such as wrought or cast iron pipe, steel, copper, or brass pipe, for the purpose of proving the strength and perfection of the weld or strength of the metal. This testing is usually accomplished by air, steam, or hydraulic pressure, the tube being submitted to a pressure of from five hundred to three thousand pounds per square inch, according to its intended use.

The objects of my invention are, first, to provide apparatus whereby pipes and tubing of all sizes may be rapidly and efficiently tested on the same machine; second, to provide means for securely holding the pipe during testing, thereby doing away with the manual labor heretofore necessary; and, third, to obtain a heavy pressure against the ends of the tubing to be tested and prevent leakage at either end during testing.

My invention consists, first, in a movable cylinder chamber or buggy carrying the testing-cylinder and piston, mounted so as to slide longitudinally along the trough; second, in mechanism for moving and locking the cylinder chamber or buggy at any desired point; third, in forming the testing-cylinders removable from the cylinder-chamber, so that cylinders of different sizes may be secured therein; fourth, in a hollow piston working in the cylinder and so connected with the hydraulic or other testing pressure that it is forced out of the cylinder against the pipe by such pressure; fifth, in combining with the cylinder and piston a spring adapted to force the piston out against the pipe and form a tight joint therewith before the testing-pressure is applied; and, finally, in certain details of construction and combinations of parts hereinafter specifically set forth.

To enable others skilled in the art to make and use my invention, I will describe its construction and operation.

In the drawings, A is the body or support of the testing apparatus, which usually consists of a long trough where hydraulic pressure is employed in testing. The top of the trough A is slightly inclined, so that the tube to be tested will be held at an incline and the air forced to and exhausted at one end when the tube is being filled with water or other fluid.

At the lower end of the trough A is mounted the ordinary stationary head B, for the reception of one end of the tube or pipe to be tested. A hollow supply-pipe, $b$, extends from the center of the head, and around it are placed suitable lead or leather washers to form a tight joint. The supply-pipe $b$ connects with the water-tank through the pipe $c$ and valve $c'$, and with the pressure-pump through the pipe $d$ and valve $d'$, the tube being first filled from the tank and then subjected to the necessary pressure from the pump.

Extending from about the center to the upper end of the trough, secured along the top of each side thereof, are the racks $e$, and on the inner side of the racks $e$ are the slides $f$ and ratchet-rows $g$, the upper and lower surfaces of the slides being smooth, and the ratchets $g$ extending into the inner edges of the slides. The racks $e$, slides $f$, and ratchet-rows $g$ are preferably formed in the same plate, and this plate secured along the top of the trough.

Mounted on the slides $f$, by means of the slots $f'$, is the cylinder chamber or buggy H, the slides $f$ fitting within the slots $f'$ and supporting the buggy above the trough. At the rear end of the buggy are the pinions $h$, which are rigidly mounted on an axle extending through the buggy, and mesh into the racks e on either side of the trough, being operated by a hand-wheel, h', attached to the axle at one side of the trough, to draw the buggy backward or forward on the slides f. Working in suitable grooves in the back of the buggy H are two sliding pawls, p, in line to catch in the ratchet-rows g when thrown out. Pivoted in the center of the rear end of the buggy, back of the pawls p, is the eccentric plate K, provided with a handle, k, extending up above the buggy. In the plate K are formed two eccentric slots, i, into each of which extends a pin from one of the sliding pawls p, so that when the pivoted plate K is turned by the handle k motion is imparted to the pawls by the pins in the eccentric slots, throwing them into or out of connection with the ratchet-rows, and thereby locking the buggy at any desired point on the trough.

The cylinder chamber or buggy H is formed hollow, as shown, for the reception of the different testing-cylinders to suit the size of pipe to be tested, the inner surface being preferably cylindrical.

The different cylinders L are provided with three or more wings, l, which extend out in different directions, so as to fit neatly within the cylinder-chamber H and support the cylinder in the center thereof. The length of the wings will be regulated by the size of the cylinder, the wings of the smaller cylinders, for smaller pipe, being proportionately longer.

M is the piston which works within the testing-cylinder L, and is packed therein by the gum or leather packing m', at the inner end of the piston. The piston has a longitudinal central opening, m, extending through it, for the passage of the testing-fluid to force the piston out of the cylinder, and is provided with a butt-head, N, against which the tube to be tested is placed. In the inner end of the piston M are formed the ports o, through which the pressure-fluid can pass when the end of the piston is brought close against the back of the cylinder and the central passage, m, closed thereby.

Secured to the inner end of the piston M is the spiral or other spring R, which forces the piston out against the tube to be tested, and forms a practically tight joint until the pressure of the fluid acts upon the piston, as hereinafter set forth. This spring R serves to force out the piston against the end of the tube when the double ratchet and pawls do not lock the buggy close enough to the tube to form a tight joint, and also to form a cushion in advancing the buggy against the tube, preventing any jarring of the mechanism.

Secured to the butt-head end of the piston M is the curved tube s, which curves upwardly so as to form an escape for any air at the top of the tube until the air is exhausted therefrom. The tube s communicates with the central passage, m, in the piston, and the pressure-fluid passes through it to the inner end of the cylinder.

At the top of the butt-head N is the air-valve t, communicating with the central passage, m, for exhausting the air from the tube to be tested. Suitable washers of lead, leather, or other material are secured against the butt-head N to form a tight joint.

The operation of my improved testing apparatus is as follows: One end of the tube to be tested is placed against the lower or stationary butt-head, B, and the buggy H is advanced along the slides f by means of the double rack e and pinions h until the butt-head N of the piston M comes against the other end of the tube, the spring R acting as a cushion and preventing the jarring of the apparatus upon the impact of the butt-head against the tube. The buggy is then locked in that position by throwing over the handle k, which turns the eccentric plate K and projects the sliding pawls p into the ratchet-rows g, the sliding pawls holding the buggy securely against the pressure in testing. As the spring R will yield the buggy can be advanced after the butt-head comes against the tube, and the pawls caught in ratchets nearer the tube, thus insuring a tight joint between butt-head and tube. The pressure of the spring is sufficient to form a tight joint at both ends of the pipe, even when the pawls do not lock the buggy close to the tube, and to hold the piston against the tube until the pressure-fluid is applied. When the tube is secured between the butt-heads B N it is held on a slight incline upward toward the buggy, so that the air, being lighter than the fluid, will be exhausted at that end. The air-valve t on the butt-head N is now opened, and the valve c' of the supply-pipe c from the tank opened to fill the pipe with fluid. The air is driven to the upper end by the fluid and exhausted through the valve t, and as the tube s in the butt-head is curved upwardly all the air rising to the top of the tube will be exhausted through it before the fluid can pass into the piston. As soon as the fluid commences to flow through the air-valve t, indicating that the tube is filled with fluid, this valve and the tank-valve c' are closed, and the tube is ready for the testing-pressure. The valve d' in the pipe d, leading from the pump, is now opened and the desired pressure applied to the tube, the pressure being indicated by the gage in the usual way. As soon as the pressure is applied the fluid under pressure passes through the hollow piston M into the cylinder L, and forces the piston against the end of the tube with as strong a pressure as that exerted on the tube in testing, thus insuring a perfectly tight joint at both ends of the tube and overcoming all liability of leakage at the ends.

During the testing the cylinder-chamber, with its piston and cylinder, is held secure by the pawls and double ratchets, and no manual labor is needed for this purpose. After the testing of the tube the pressure-valve d' is closed, the pawls p withdrawn from the double ratchet-row by the movement of the eccentric plate K, the buggy is run back by the double rack and pinions, and the tube removed, to be replaced by another.

When it is desired to test pipe of another size, all that is necessary is to slide the cylinder out of the cylinder-chamber and place one of the proper size therein, the apparatus, with this slight change, being adapted to test all sizes of pipe.

The apparatus is easily operated, efficient and sure, and does away with a large amount of manual labor. It is also rapid in operation, being capable of testing twice the number of pipe as the other apparatus in the same time.

What I claim as my invention, and desire to secure by Letters Patent, is—

1. In apparatus for testing tubing, the combination of the stationary head B, the sliding cylinder chamber or buggy H, and the double rack e and pinions h, substantially as and for the purposes set forth.

2. In apparatus for testing tubing, the sliding cylinder chamber or buggy, in combination with the double rack and pinions and double ratchet-row and pawls, substantially as and for the purposes set forth.

3. In apparatus for testing tubing, the sliding cylinder chamber or buggy, in combination with the eccentric plate K, pawls p, and double ratchet-row f, substantially as and for the purposes set forth.

4. In apparatus for testing tubing, a cylinder-chamber formed hollow for the reception of different testing-cylinders, adapted for the testing of different sizes of tubing, substantially as described.

5. In combination with the hollow cylinder-chamber, the removable testing-cylinder provided with wings to support it within the cylinder-chamber, substantially as set forth.

6. In apparatus for testing tubing, the testing-cylinder, in combination with the hollow piston working in said cylinder and so connected with the pressure-fluid as to be automatically forced out against the tubing by the pressure of said fluid in testing, substantially as and for the purposes set forth.

7. In apparatus for testing tubing, the combination of the cylinder L and the piston M working therein, having the central passage, m, and ports o, substantially as and for the purposes set forth.

8. In apparatus for testing tubing, the cylinder and piston, in combination with a spring adapted to force the piston from the cylinder against the end of the tubing, substantially as and for the purposes set forth.

9. The combination of the sliding buggy H, carrying the testing-cylinder L, with the piston M and spring R, substantially as and for the purposes set forth.

10. The combination of the sliding buggy H, carrying the cylinder L, ratchet-and-pawl mechanism for locking the buggy, the piston M, and spring R, for forcing out the piston, substantially as and for the purposes set forth.

11. In apparatus for testing tubing, the combination of the piston M and the upwardly-curved tube s, attached to the butt-head thereof, and communicating with the central passage, m, substantially as and for the purposes set forth.

In testimony whereof I, the said SAMUEL MYERS, have hereunto set my hand.

SAMUEL MYERS.

Witnesses:
  J. R. HARBISON,
  JAMES I. KAY.